United States Patent
Zhang et al.

(10) Patent No.: US 8,793,866 B1
(45) Date of Patent: Aug. 5, 2014

(54) METHOD FOR PROVIDING A PERPENDICULAR MAGNETIC RECORDING HEAD

(75) Inventors: Jinqiu Zhang, Fremont, CA (US); Liubo Hong, San Jose, CA (US); Yong Shen, Saratoga, CA (US); Yizhong Wang, Woodbury, MN (US); Hai Sun, Milpitas, CA (US); Li He, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1136 days.

(21) Appl. No.: 11/960,596

(22) Filed: Dec. 19, 2007

(51) Int. Cl.
*G11B 5/187* (2006.01)
*C23C 14/22* (2006.01)

(52) U.S. Cl.
USPC .............. 29/603.13; 29/603.15; 427/129; 427/130; 427/496; 427/551; 438/701; 360/125.15

(58) Field of Classification Search
USPC ............. 29/603.07, 603.13, 603.15; 427/127–129, 131, 496, 551; 216/47, 216/48, 63, 66, 94; 438/656, 701, 700; 360/125.15, 125.17
See application file for complete search history.

(56) References Cited

U.S. PATENT DOCUMENTS

| | | | | |
|---|---|---|---|---|
| 4,675,075 A | * | 6/1987 | Sakai et al. | ............ 427/131 X |
| 4,968,382 A | * | 11/1990 | Jacobson et al. | ............ 216/66 X |
| 5,075,956 A | * | 12/1991 | Das | ............ 360/125.15 X |
| 5,635,423 A | * | 6/1997 | Huang et al. | ............ 438/700 X |
| 5,996,213 A | | 12/1999 | Shen et al. | |
| 6,024,885 A | | 2/2000 | Pendharkar et al. | |
| 6,054,384 A | * | 4/2000 | Wang et al. | ............ 216/47 X |
| 6,195,229 B1 | | 2/2001 | Shen et al. | |
| 6,243,939 B1 | | 6/2001 | Chen et al. | |
| 6,368,519 B1 | | 4/2002 | Katakura et al. | |
| 6,423,475 B1 | | 7/2002 | Lyons et al. | |
| 6,472,107 B1 | | 10/2002 | Chan | |
| 6,521,335 B1 | | 2/2003 | Amin et al. | |
| 6,540,928 B1 | | 4/2003 | Kobrin et al. | |
| 6,680,829 B2 | | 1/2004 | Chen et al. | |
| 6,824,816 B2 | * | 11/2004 | Aaltonen et al. | ........ 427/131 X |
| 6,857,181 B2 | * | 2/2005 | Lo et al. | ............ 29/603.15 |
| 6,862,798 B2 | | 3/2005 | Kruger et al. | |

(Continued)

FOREIGN PATENT DOCUMENTS

JP   63232335 A  *  9/1988   ............ 438/656

OTHER PUBLICATIONS

Williams, Kirt R.; Gupta, Kishan; Wasilik, Matthew. "Etch Rates for Micromachining Processing—Part II" Journal of Microelectromechanical Systems, vol. 12, No. 6, pp. 761-778, Dec. 2003.

*Primary Examiner* — A. Dexter Tugbang

(57) ABSTRACT

A method provides a PMR transducer. In one aspect, the method includes forming a trench in an intermediate layer using reactive ion etch(es). The trench top is wider than its bottom. In this aspect, the method also includes providing a seed layer using atomic layer deposition and providing a PMR pole on the seed layer. Portion(s) of the seed layer and PMR pole reside in the trench. In another aspect, the method includes providing a mask including a trench having a top wider than its bottom. In this aspect, the method includes providing mask material in the trench, providing an intermediate layer on the mask material and removing the mask material to provide another trench in the intermediate layer. In this aspect, the method also includes providing a PMR pole in the additional trench.

9 Claims, 15 Drawing Sheets

(56) References Cited

U.S. PATENT DOCUMENTS

| | | |
|---|---|---|
| 6,866,987 B2 * | 3/2005 | Lee .................. 216/66 X |
| 6,870,712 B2 | 3/2005 | Chen et al. |
| 6,877,213 B2 | 4/2005 | Zolla |
| 6,943,993 B2 | 9/2005 | Chang et al. |
| 6,949,833 B2 | 9/2005 | O'Kane et al. |
| 6,954,332 B1 | 10/2005 | Hong et al. |
| 6,954,340 B2 | 10/2005 | Shukh et al. |
| 6,975,486 B2 | 12/2005 | Chen et al. |
| 6,980,403 B2 | 12/2005 | Hasegawa |
| 7,023,658 B1 | 4/2006 | Knapp et al. |
| 7,024,756 B2 | 4/2006 | Le et al. |
| 7,042,682 B2 | 5/2006 | Hu et al. |
| 7,070,698 B2 | 7/2006 | Le |
| 7,080,698 B2 | 7/2006 | Mercer et al. |
| 7,120,989 B2 | 10/2006 | Yang et al. |
| 7,193,815 B1 | 3/2007 | Stoev et al. |
| 7,203,032 B2 | 4/2007 | Kimura et al. |
| 7,239,478 B1 | 7/2007 | Sin et al. |
| 7,444,740 B1 | 11/2008 | Chung et al. |
| 8,018,677 B1 | 9/2011 | Chung et al. |
| 2001/0022704 A1 | 9/2001 | Hong |
| 2002/0181162 A1 | 12/2002 | Chen et al. |
| 2003/0048584 A1 | 3/2003 | Song et al. |
| 2003/0090834 A1 | 5/2003 | Kamarajugadda et al. |
| 2004/0020778 A1 * | 2/2004 | Lin et al. .................. 427/128 X |
| 2004/0223258 A1 | 11/2004 | Giorgis et al. |
| 2005/0024771 A1 | 2/2005 | Le |
| 2005/0024779 A1 | 2/2005 | Le et al. |
| 2005/0185332 A1 | 8/2005 | Hsiao et al. |
| 2005/0225898 A1 | 10/2005 | Huang et al. |
| 2006/0002014 A1 | 1/2006 | Sasaki et al. |
| 2006/0002023 A1 | 1/2006 | Le et al. |
| 2006/0023352 A1 | 2/2006 | Le et al. |
| 2006/0044681 A1 | 3/2006 | Le et al. |
| 2006/0044682 A1 | 3/2006 | Le et al. |
| 2006/0102956 A1 | 5/2006 | Kamarajugadda et al. |
| 2006/0109588 A1 | 5/2006 | Le et al. |
| 2006/0174474 A1 | 8/2006 | Le |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0113395 A1 | 5/2007 | Dulay et al. |
| 2007/0121248 A1 | 5/2007 | Sasaki et al. |
| 2007/0137028 A1 | 6/2007 | Carey et al. |
| 2007/0177301 A1 | 8/2007 | Han et al. |
| 2008/0316653 A1 | 12/2008 | Sasaki et al. |

\* cited by examiner

METHOD FOR PROVIDING A PERPENDICULAR MAGNETIC RECORDING HEAD

BACKGROUND

Conventional perpendicular magnetic recording (PMR) heads can be fabricated in a number of ways. FIG. 1 is a flow chart depicting a conventional method 10 for fabricating a PMR transducer using a conventional process. For simplicity, some steps are omitted. FIGS. 2-5 are diagrams a depicting conventional PMR transducer 50 as viewed from the air-bearing surface (ABS) during fabrication. The conventional PMR transducer 50 may be part of a coupled with a slider to form a PMR head. In addition, a read transducer (not shown) may be included to form a merged PMR head. For simplicity, only a portion of the conventional PMR transducer 50 is shown. The conventional method 10 is described in the context of the conventional PMR transducer 50.

An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 16. FIG. 2 depicts the conventional PMR transducer 50 after step 14 is completed. Thus, an underlayer 52, aluminum oxide layer 54, CMP stop layer 56, and hard mask layer 58 are shown. The underlayer 52 is typically made of NiCr. Also depicted are the photoresist mask 60 and aperture 62 within the photoresist mask. The aperture 62 is located above the desired position of the PMR pole.

An aperture is formed in the hard mask layer 58 using a conventional ion milling process, via step 16. Step 16 also includes forming an aperture in the CMP stop layer 56. FIG. 3 depicts the conventional PMR transducer 50 after step 16 has been completed. Thus, a hard mask 58' has been formed by the hard mask layer. An aperture 64 has been formed in the hard mask 58' and the CMP stop layer 56'.

Using the hard mask 58' and photoresist mask 60, a trench is formed in the aluminum oxide layer 54, via step 18. Step 18 is typically performed using an alumina reactive ion etch (RIE). FIG. 4 depicts the conventional PMR transducer 50 after step 18 is performed. Thus, a trench 66 has been formed in the aluminum oxide layer 54'. The top of the trench 66 is wider than the trench bottom. In addition, the trench 66 extends through the aluminum oxide layer 54'. As a result, the PMR pole (not shown) formed therein will have its top surface wider than its bottom. Consequently, the sidewalls of the PMR pole will have a reverse angle.

The conventional PMR pole materials are deposited, via step 20. A chemical mechanical planarization (CMP) is then performed, via step 22. FIG. 5 depicts the conventional PMR transducer 50 after step 22 has been performed. Thus, the conventional PMR pole 28 has been formed.

FIG. 6 is a flow chart depicting another conventional method 70 for fabricating a PMR transducer using a conventional process. For simplicity, some steps are omitted. FIGS. 7-8 are diagrams a depicting conventional PMR transducer 50' as viewed from the air-bearing surface (ABS) during fabrication. The conventional PMR transducer 50' may be part of a coupled with a slider to form a PMR head. In addition, a read transducer (not shown) may be included to form a merged PMR head. For simplicity, only a portion of the conventional PMR transducer 50 is shown. The conventional method 70 is described in the context of the conventional PMR transducer 50'.

PMR pole and CMP stop layers are provided, via step 72. The PMR pole layer(s) may include seed layers as well as magnetic layer(s). The CMP stop layer may include materials such as Ru or DLC. A hard mask is provided on the layers, via step 74. The hard mask covers the portion of the PMR pole layer from which the PMR pole is desired to be formed. The PMR pole is defined, typically using an ion mill and pole trim, via step 76. FIG. 7 depicts the PMR transducer 50' after step 76 has been performed. Thus, the conventional PMR pole 68' is shown on the underlayer 52'. The CMP stop layer 56" and hard mask 58" are also shown. Because of the presence of the hard mask, the top of the PMR pole 68' is wider than its bottom.

An intermediate layer is provided on the PMR pole 68', via step 78. A CMP is performed via step 80. FIG. 8 depicts the PMR transducer 50' after step 80 is performed. Thus, the aluminum oxide layer 54" is shown. Because a CMP has been performed, the top surface of the aluminum oxide layer 54" is substantially flat and co-planar with the top surface of the CMP stop layer 56". Fabrication of the conventional PMR transducer 50' may be completed, via step 82. For example, step 82 may include forming a write gap (not shown) and a top shield (not shown).

Although the conventional methods 10 and 70 may provide the conventional PMR transducer 50 and 50', there may be drawbacks. In particular, the conventional PMR poles 68 and 68' of the conventional PMR transducers 50 and 50', respectively, may be subject to nonuniformities. As can be seen in FIG. 3-5, the aperture 64 in the hard mask 58' and CMP stop layer 56' is not symmetric. In addition, fencing (not shown) from redeposition of the NiCr hard mask 58' during step 16 of the method 10 may exacerbate asymmetries in the hard mask 58'. Consequently, the trench 66 in the aluminum oxide layer 54' and the sidewalls of the conventional PMR pole 68 are not symmetric. Further, the CMP performed in step 22 may remove varying amounts of the aluminum oxide layer 54'. Thus, the critical dimension of the conventional PMR pole 68 in the track width direction may vary. Such variations may significantly affect the performance of the conventional PMR transducer 50. In addition, variations in the CMP of steps 22 or 80 may result in variations of the top surface of the conventional PMR transducer 50 or 50', respectively. Further, because of the definition of the PMR pole in step 76, the shape of the conventional PMR pole 68' may be poorly controlled. Thus, the PMR pole 68' may be subject to variations. Thus, performance of the conventional PMR transducers 50 and 50' may be adversely affected.

Accordingly, what is needed is an improved method for fabricating a PMR transducer.

SUMMARY

A method and system for providing a perpendicular magnetic recording (PMR) transducer are disclosed. In one aspect, the method and system include forming a trench in an intermediate layer using at least one reactive ion etch. The trench top is wider than the trench bottom. In this aspect, the method and system also include providing a seed layer using atomic layer deposition and providing a PMR pole on the seed layer. At least a portion of the seed layer and at least a portion of the PMR pole reside in the trench. In another aspect, the method and system include providing a mask having a first trench therein. The first trench has a top wider than the trench bottom. In this aspect, the method and system include providing a mask material in the first trench, providing an intermediate layer on the mask material and removing the mask material to provide a second trench in the intermediate layer.

In this aspect, the method and system also include providing a PMR pole in the second trench.

DETAILED DESCRIPTION OF THE PREFERRED EMBODIMENTS

Figure 1:
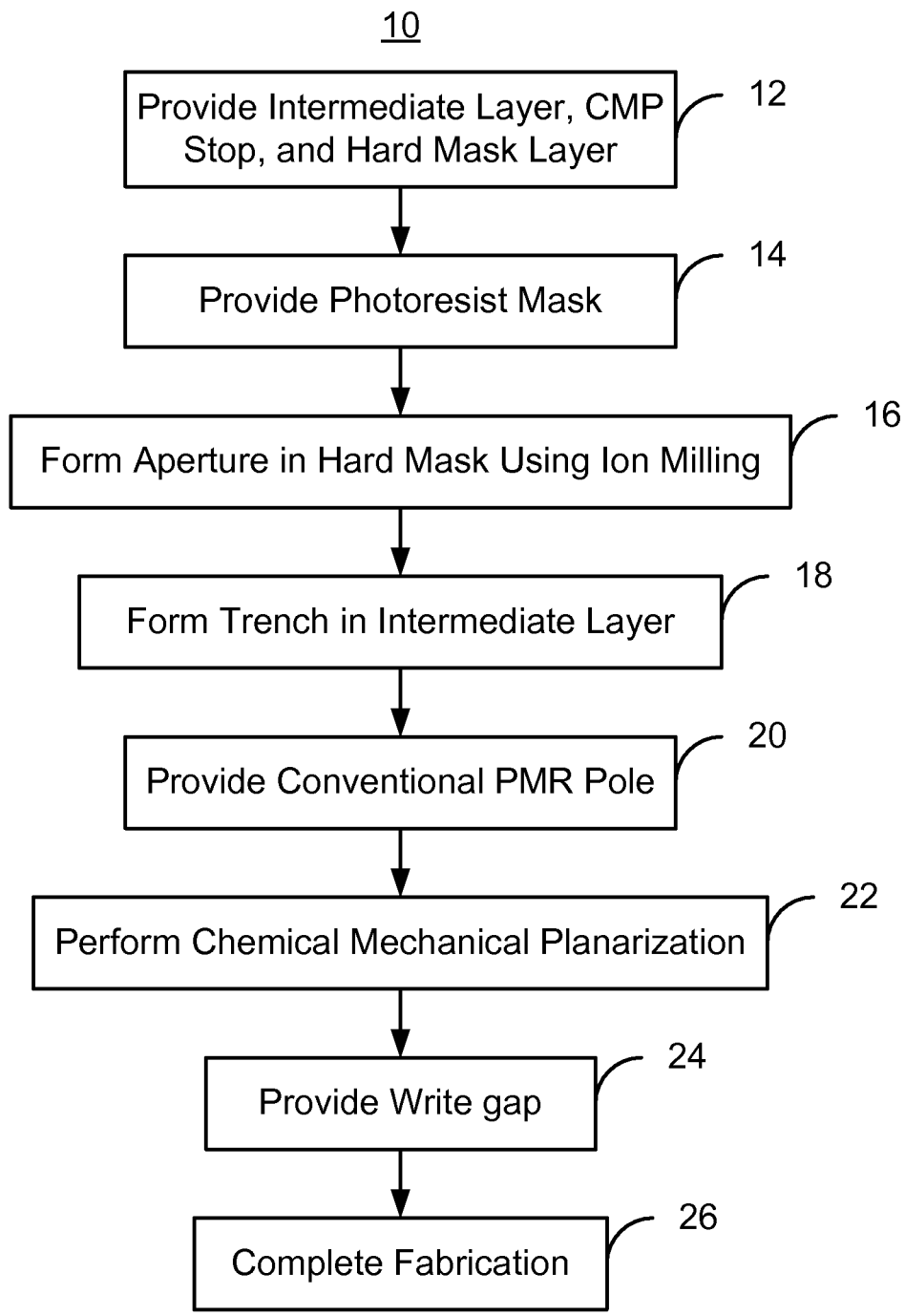
FIG. 1 is a flow chart depicting a conventional method for fabricating a PMR head.
Figure 2:
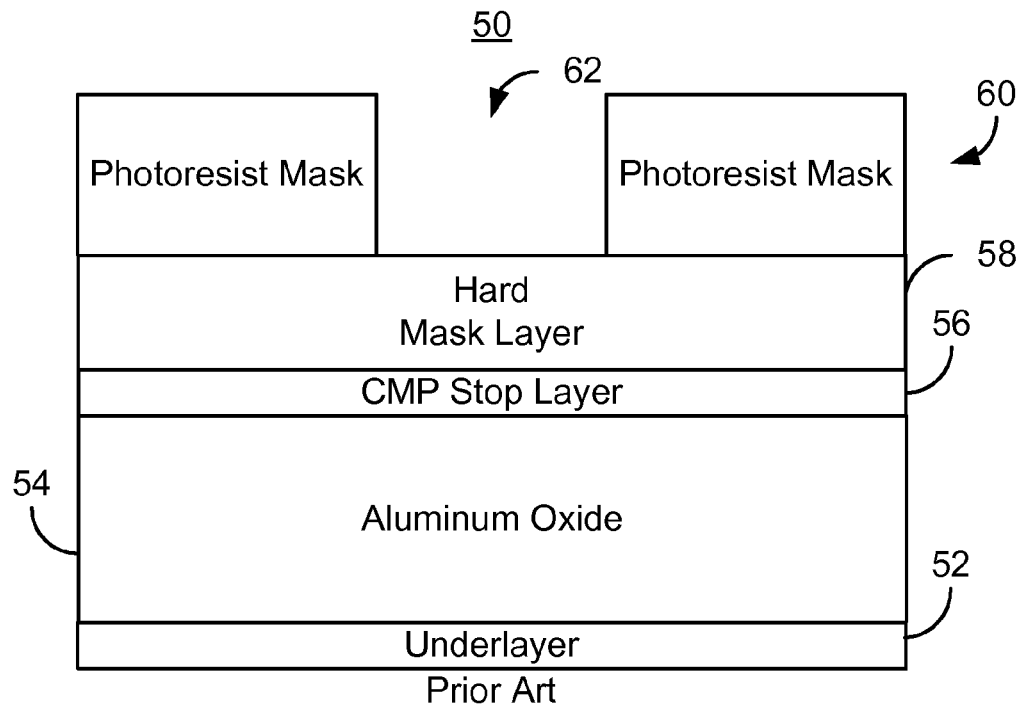
FIGS. 2-5 are diagrams depicting a conventional PMR transducer during fabrication.
Figure 3:
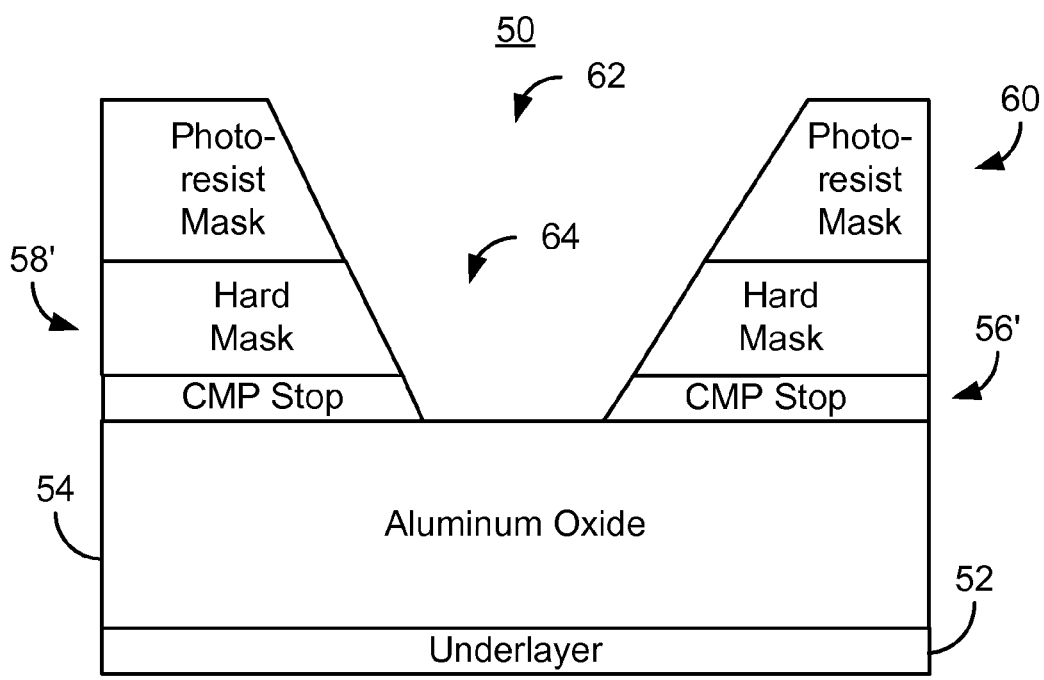
Figure 4:
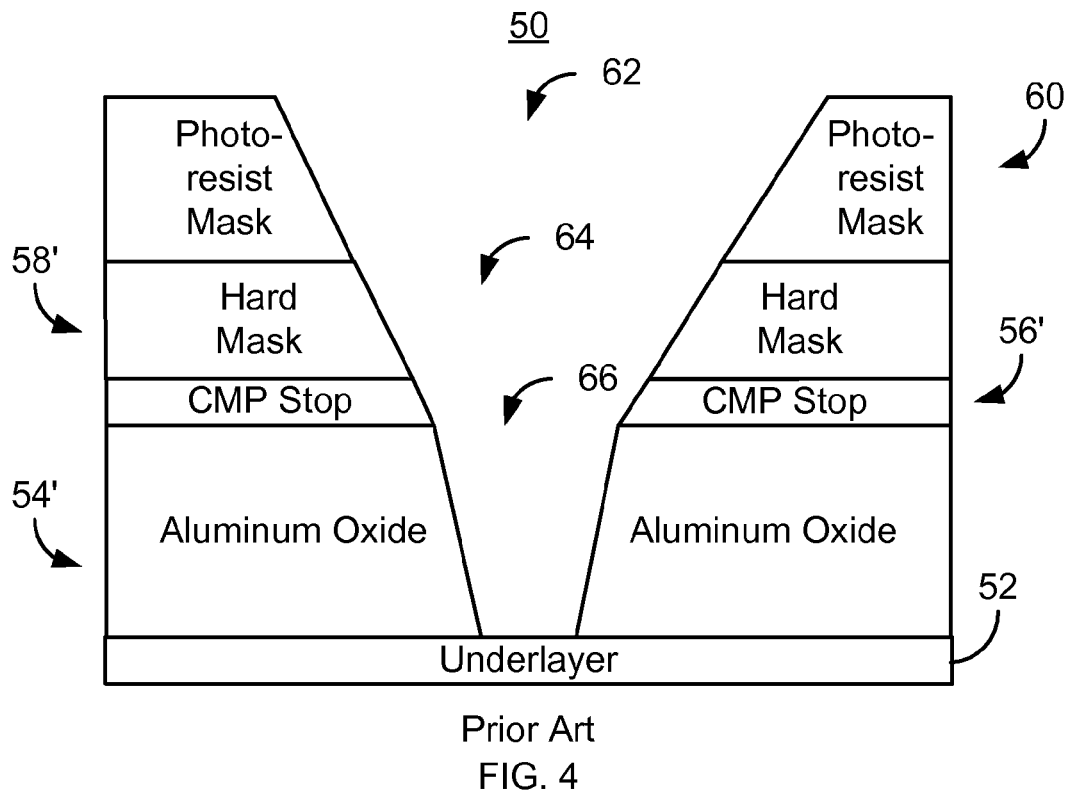
Figure 5:
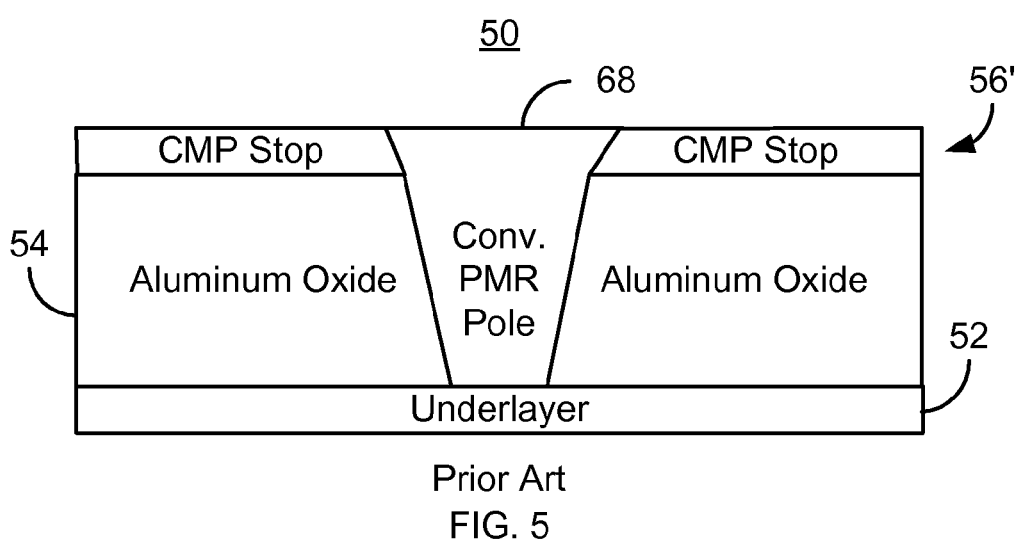
Figure 6:
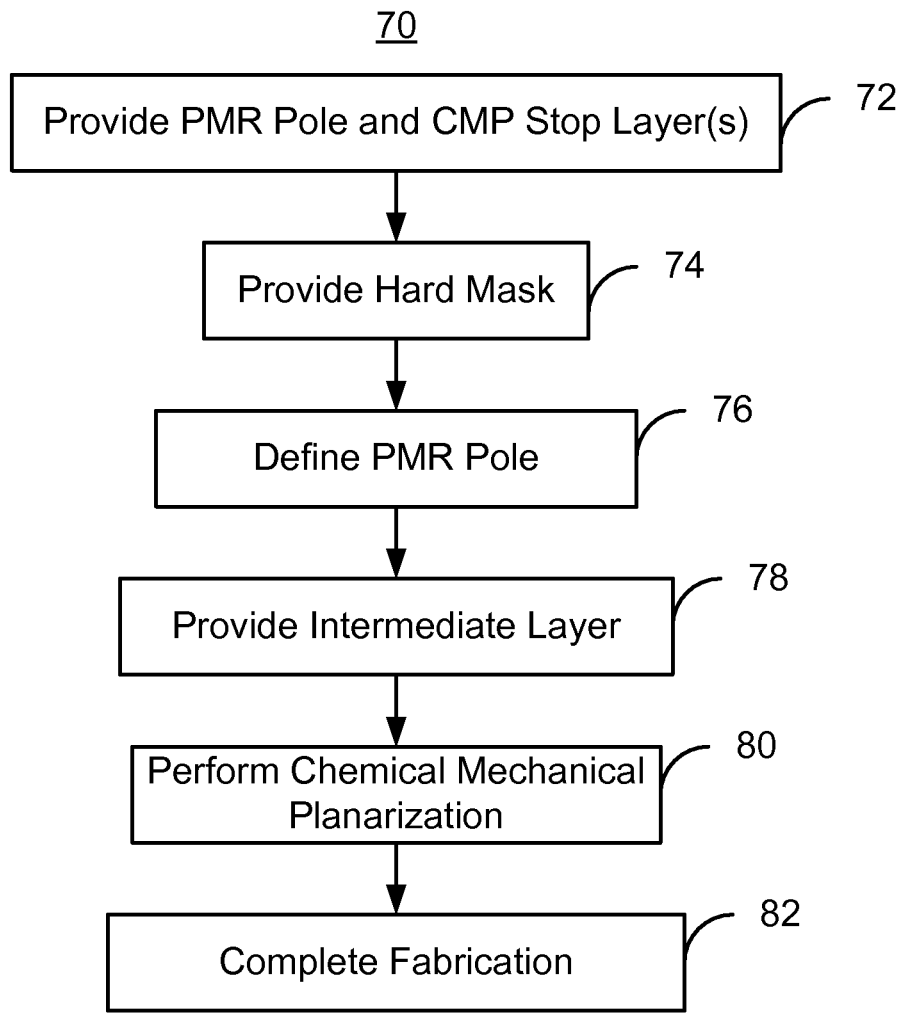
FIG. 6 is a flow chart depicting another conventional method for fabricating a PMR head.
Figure 7:
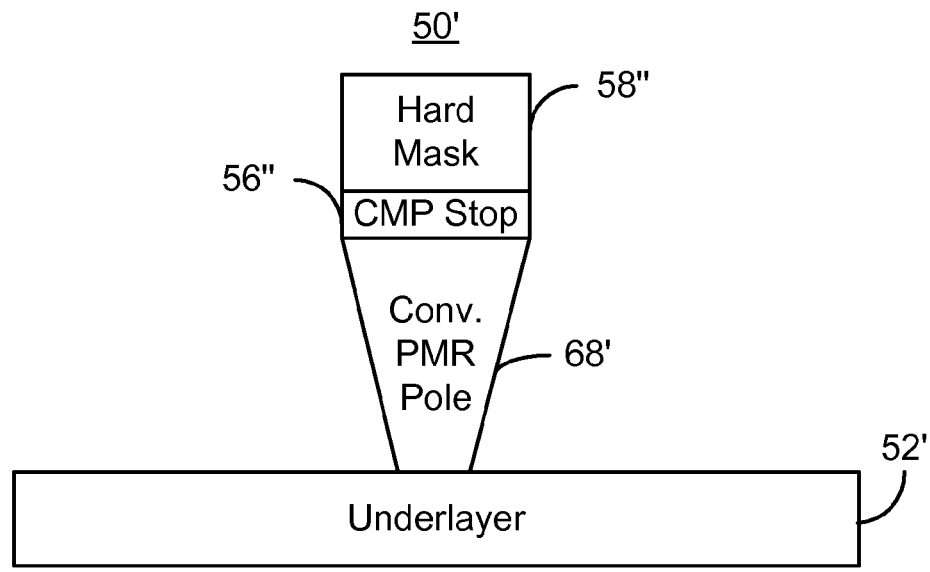
FIGS. 7-8 are diagrams depicting a conventional PMR transducer during fabrication.
Figure 8:
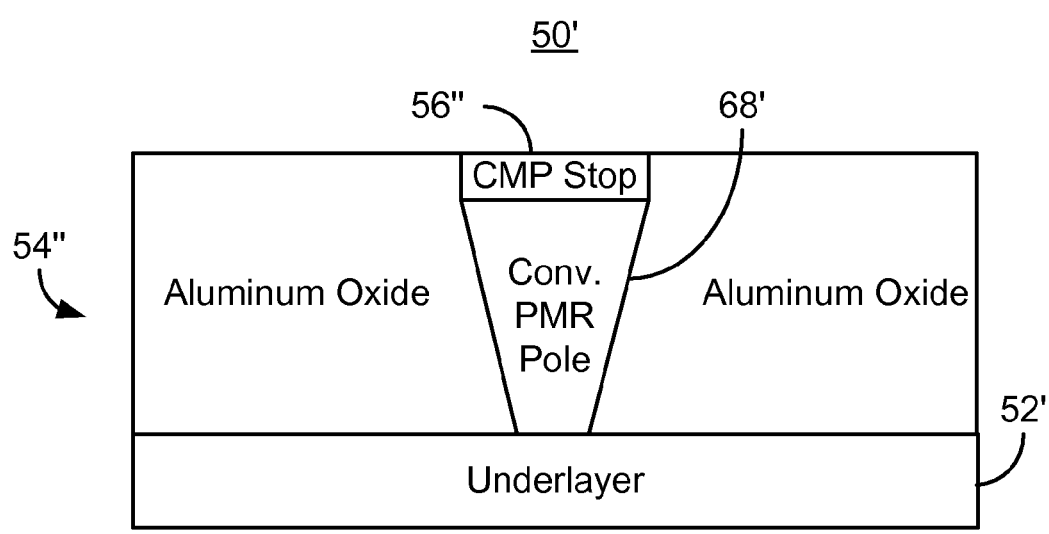
Figure 9:
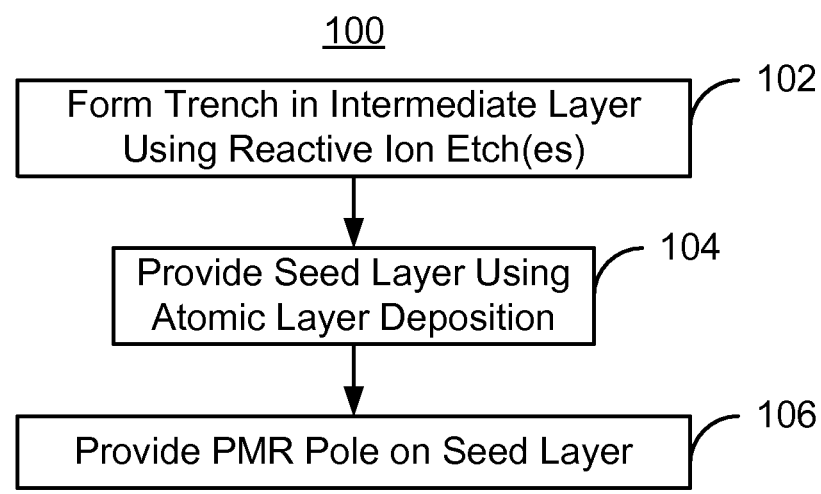
FIG. 9 is a flow chart depicting an exemplary embodiment of a method for fabricating a PMR transducer.

FIG. 9 is a flow chart depicting an exemplary embodiment of a method 100 for fabricating a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR transducer. However, the method 100 may be used to fabricate multiple transducers at substantially the same time.

In one embodiment, the method 100 commences after formation of the intermediate layer(s) in which the PMR pole is to reside. A trench is formed in the intermediate layer using one or more RIE(s), via step 102. The trench formed is for a PMR pole and thus has a top wider than the bottom. In one embodiment, step 102 includes using a first RIE to from an aperture in a hard mask layer and a planarization stop layer on the hard mask layer. The first RIE may utilize a fluorine-containing gas. The apertures in the hard mask and planarization stop layers expose a portion of the intermediate layer. Additional RIE(s) may then be performed remove the portion of intermediate layer exposed by the apertures. Thus, the trench may be formed.

A seed layer is deposited using atomic layer deposition (ALD), via step 104. At least a portion of the seed layer resides in the trench in the intermediate layer. In one embodiment, the seed layer may be nonmagnetic. In such an embodiment, the seed layer may be used to control the width of the PMR pole.

A PMR pole is provided on the seed layer, via step 106. In one embodiment, the PMR pole is plated in step 106. However, in another embodiment, another process may be used to form the PMR pole.

Because the RIE(s) are used in step 102, the apertures formed in the hard mask and intermediate layers may be more uniform and less subject to fencing. Thus, asymmetries in the PMR pole may thus be reduced. The critical dimension for the PMR pole may also be less subject to variations. The PMR pole may, therefore, be made thinner. Further, the seed layer provided using ALD may be thin, smooth, and be used to control the width of the PMR pole. Consequently, the method 100 may be used to fabricate a PMR pole having improved performance at higher densities.

Figure 10:
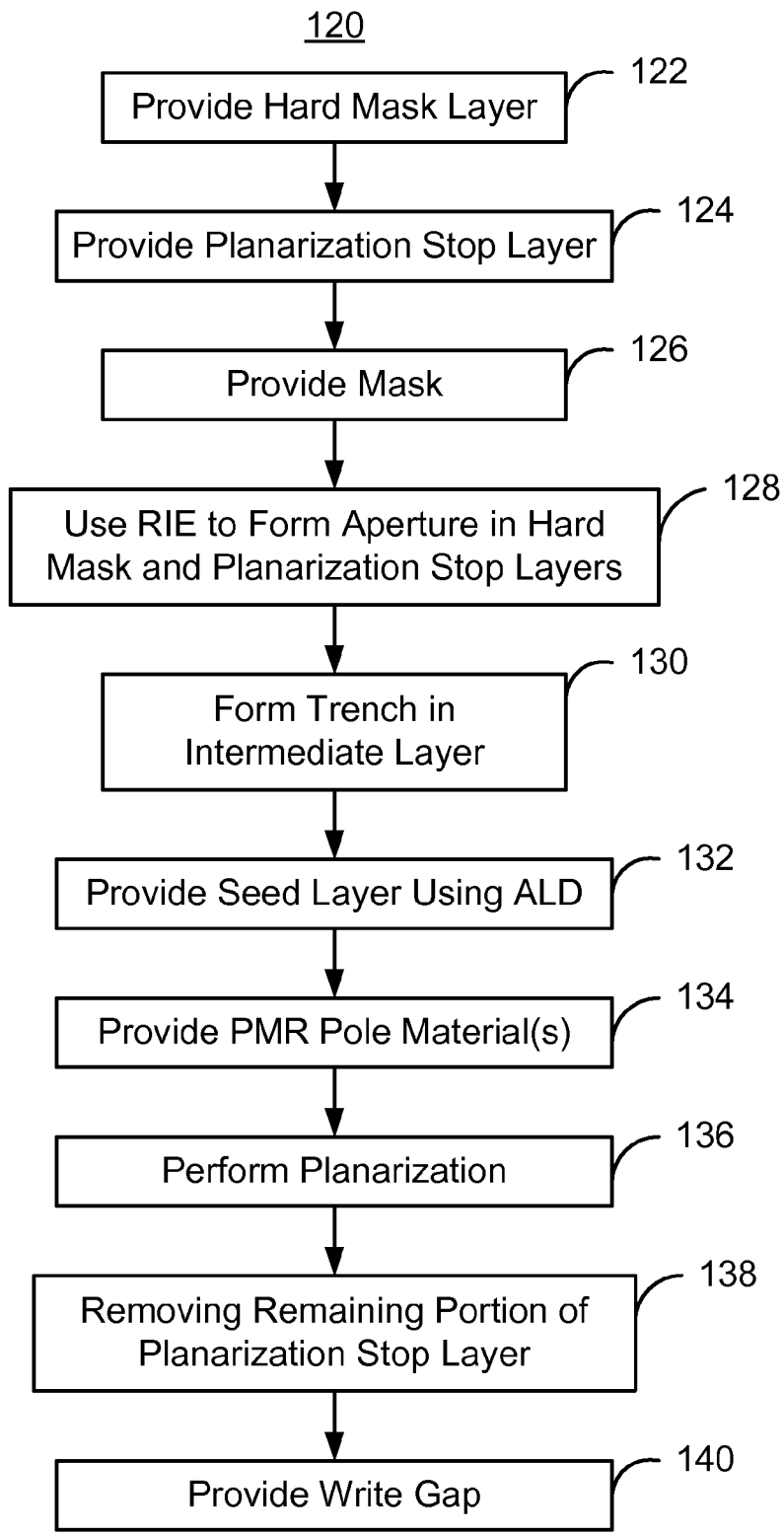
FIG. 10 is a flow chart depicting another embodiment of a method for fabricating a PMR transducer.

FIG. 10 is a flow chart depicting another exemplary embodiment of a method 120 for fabricating a PMR transducer. For simplicity, some steps may be omitted. FIGS. 11-18 are diagrams depicting an exemplary embodiment of a PMR transducer 150 as viewed from the ABS during fabrication. For clarity, FIGS. 11-18 are not to scale. Referring to FIGS. 10-18, the method 120 is described in the context of the PMR transducer 150. However, the method 120 may be used to form another device (not shown). The PMR transducer 150 being fabricated may be part of a merged head that also includes a read head (not shown) and resides on a slider (not shown). The method 120 also may commence after formation of other portions of the PMR transducer 150. In one embodiment, the method 120 starts after formation of an underlayer that may include NiCr and an intermediate layer that may include aluminum oxide. The method 120 is also described in the context of providing a single PMR transducer. However, the method 120 may be used to fabricate multiple transducers at substantially the same time.

A hard mask layer is provided on the intermediate layer, via step 122. In one embodiment, step 122 may include depositing a layer of at least one of Ta, NiNb, and NiCr. A planarization stop layer is provided on the hard mask layer, via step 124. The planarization stop layer may include materials such as diamond-like carbon (DLC). A mask is provided on the planarization stop layer, via step 126. In one embodiment, the mask is a photoresist mask. However, in another embodiment, another type of mask may be used. The resist mask has an aperture therein. The aperture is over the portion of the intermediate layer in which the PMR pole is to be fabricated.

Figure 11:
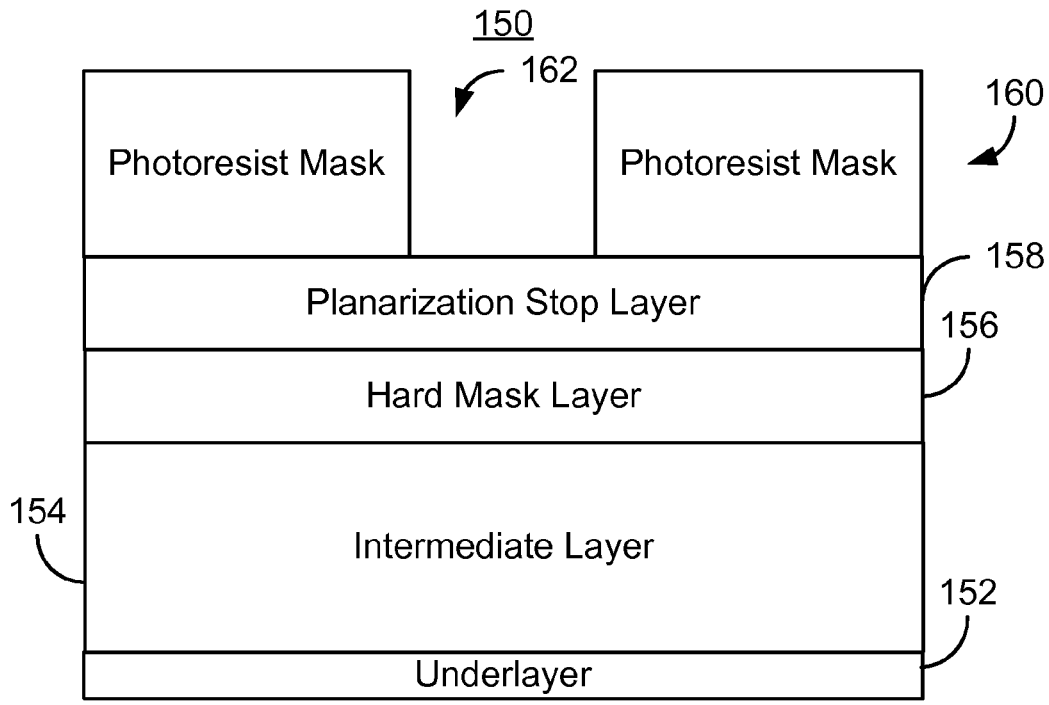
FIGS. 11-18 are diagrams depicting an exemplary embodiment of a perpendicular magnetic recording transducer during fabrication.

FIG. 11 depicts the PMR transducer 150 after step 126 is completed. The PMR transducer 150 includes an underlayer 152, an intermediate layer 154, a hard mask layer 156, and a planarization stop layer 158. Also shown is photoresist mask 160. The hard mask layer 156 resides on the intermediate layer 154. In one embodiment, the hard mask layer 156 has a thickness of at least two hundred and not more than one thousand Angstroms. In another embodiment, the thickness of the hard mask layer 156 may be at least five hundred and not more than six hundred Angstroms. In one embodiment, the planarization stop layer 158 may have a thickness of at least one hundred and not more than one thousand Angstroms. In another embodiment, the planarization stop layer 158 may have a thickness of at least one hundred and not more than three hundred Angstroms. The photoresist mask 160 includes an aperture 162 therein.

Figure 12:
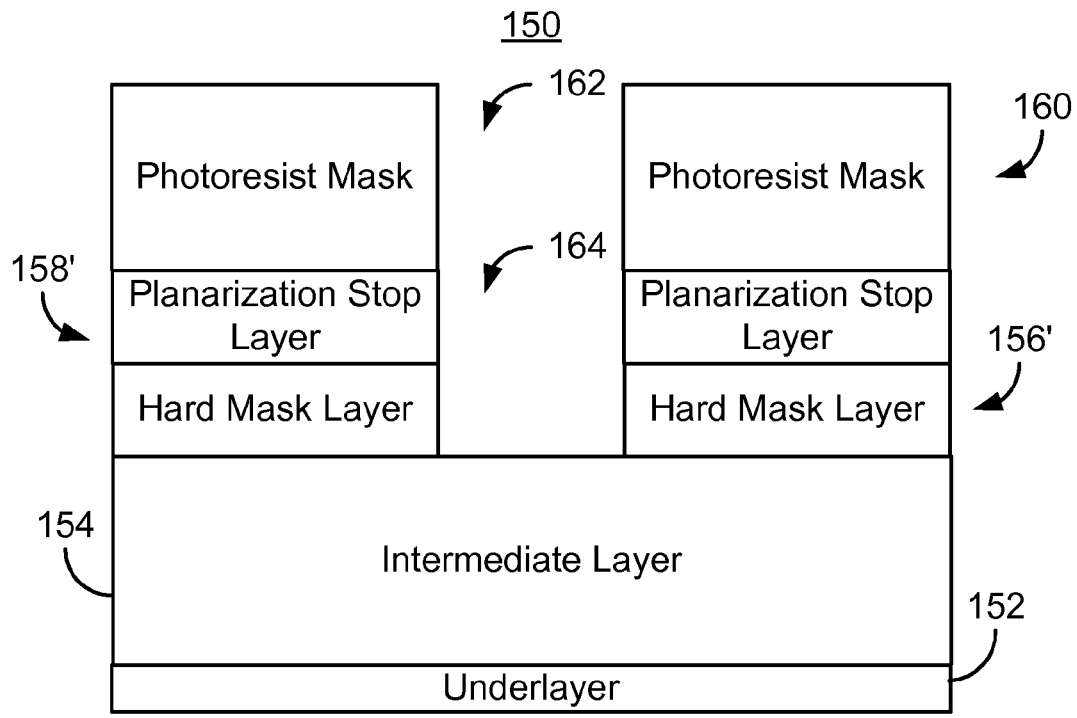

An aperture in the hard mask layer 156 and the planarization stop layer 158 is formed using a RIE, via step 128. The RIE removes portions of the hard mask layer 156 and planarization stop layer 158 exposed by the aperture 162 in the photoresist mask 160. In one embodiment, step 128 includes performing a RIE utilizing a fluorine-containing gas. FIG. 12 depicts the PMR transducer 150 after step 128 is performed. Thus, aperture 164 has been formed in hard mask layer 156' and planarization stop layer 158'.

Figure 13:
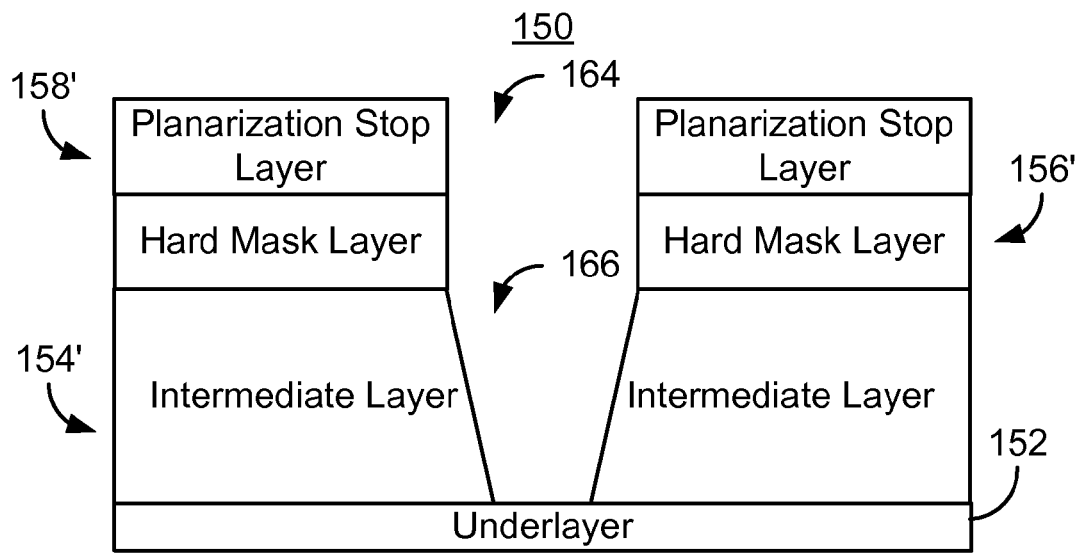

A trench is formed in the intermediate layer 154 using a RIE, via step 130. In one embodiment, the RIE utilizes a chlorine-containing gas. Thus, formation of the trench has utilized two RIEs. A first RIE may be used to form the aperture in the hard mask 156. A second RIE may be used to form the trench in the intermediate layer 154. In addition, the resist mask 160 may be removed. FIG. 13 depicts the PMR transducer after step 130 is performed. Thus, the trench 166 has been formed. In the embodiment shown, the trench 166 extends through the intermediate layer 154'. The trench 166 has a top wider than the bottom. Thus, the trench 166 is appropriate for a PMR pole.

Figure 14:
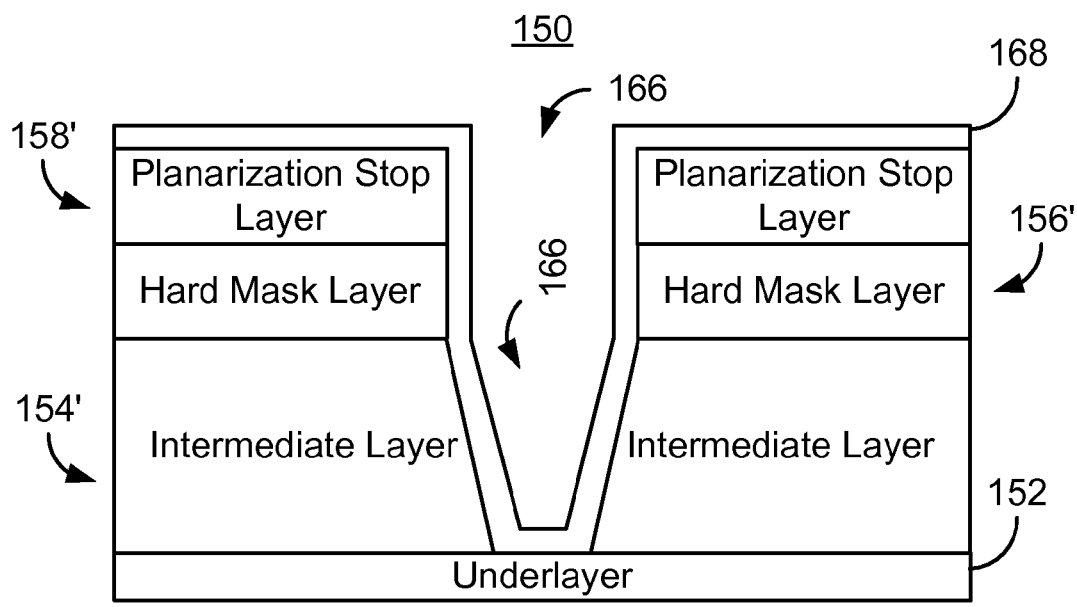

A seed layer is provided using ALD, via step 132. At least a portion of the seed layer may reside in the trench 166. FIG. 14 depicts the PMR transducer 150 after step 132 is performed. Thus, a seed layer 168 is shown. In one embodiment, the seed layer 168 is magnetic. In such an embodiment, the seed layer 168 may be magnetically indistinct from the PMR pole. Thus, the seed layer 168 may be considered part of the PMR pole. In another embodiment, the seed layer 168 may be nonmagnetic. In such an embodiment, the seed layer 168 would be magnetically distinct from the PMR pole. Thus, the thickness of the seed layer 168 may be used to tune the width of the PMR pole being formed. For example, in one embodiment, the seed layer may be at least one hundred and not more than eight hundred Angstroms. Consequently, use of a nonmagnetic seed layer allows the width of the PMR pole being formed to be reduced by one hundred to eight hundred Angstroms.

Figure 15:
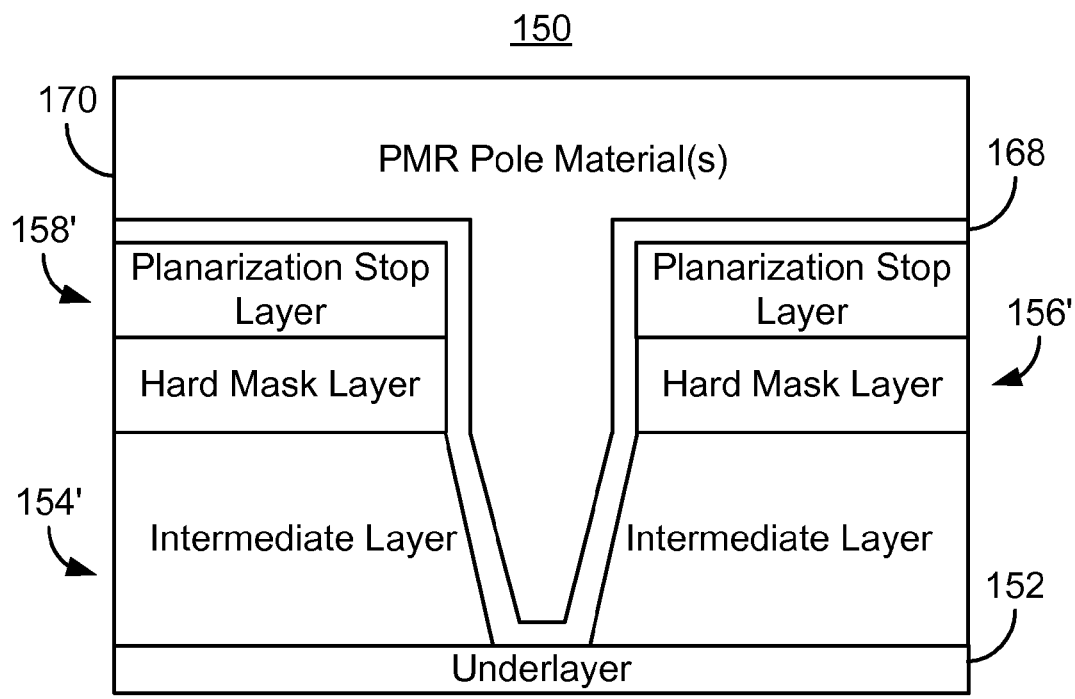

PMR pole material(s) are provided in the trench 166 after the seed layer is provided, via step 134. In one embodiment, the layer(s) of the PMR pole are plated in step 134. In another embodiment, another process for providing the PMR pole material(s) may be used. FIG. 15 depicts the PMR transducer 150 after step 134 is performed. Consequently, the PMR pole material(s) 170 are shown.

Figure 16:
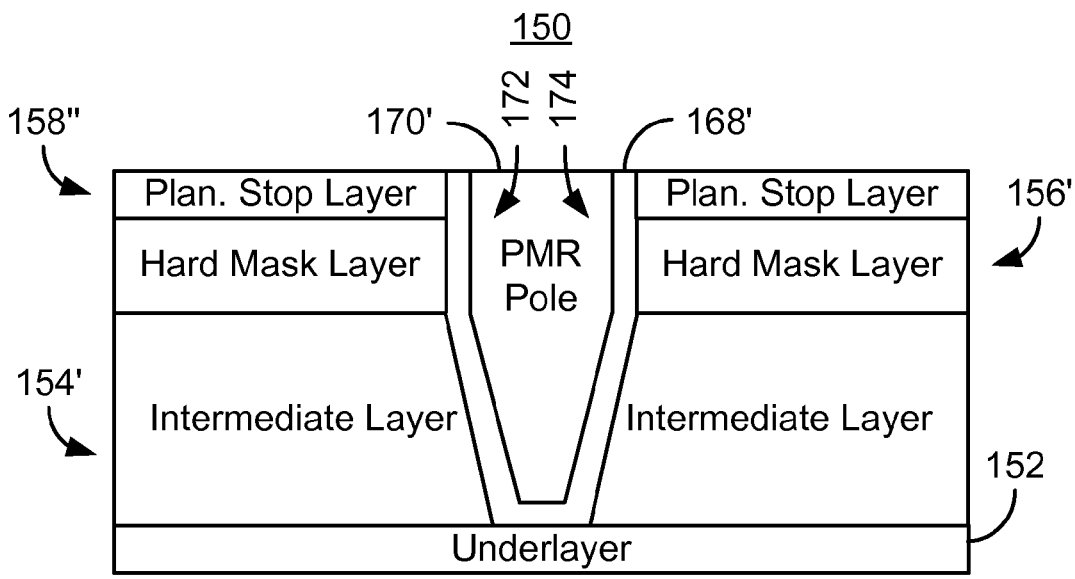

A planarization is performed, via step 136. In one embodiment, the planarization performed in step 136 is a CMP. In addition, an ion beam etch may also be performed as part of step 136. The planarization is terminated when at least a portion of the planarization stop layer 158' remains. FIG. 16 depicts the PMR transducer after step 136 is performed. Portions of the seed layer 168, PMR pole materials 170 and planarization stop layer 158' have been removed. Consequently, the PMR pole 170', remaining seed layer 168', and remaining stop layer 158" are shown. As can be seen in FIG. 16, the PMR pole 170' includes sidewalls 172 and 174.

Figure 17:
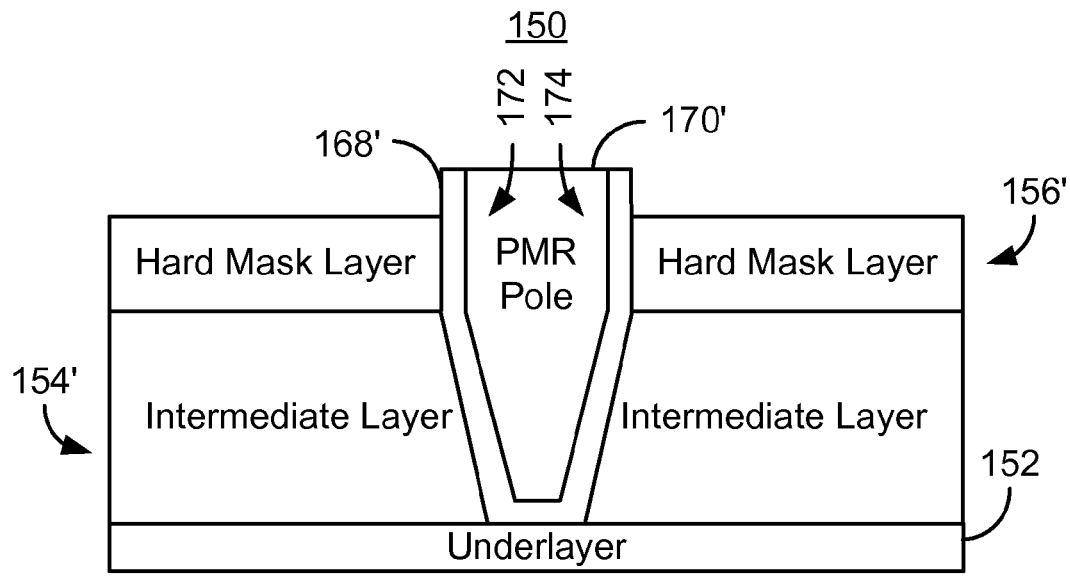

The remaining portion of the planarization stop layer 158" is removed, via step 138. In one embodiment, step 138 includes performing an oxygen RIE. FIG. 17 depicts the PMR transducer 150 after step 138 is performed. Because the planarization stop layer 158" has been removed, a top portion of the PMR pole 170' is exposed.

Figure 18:
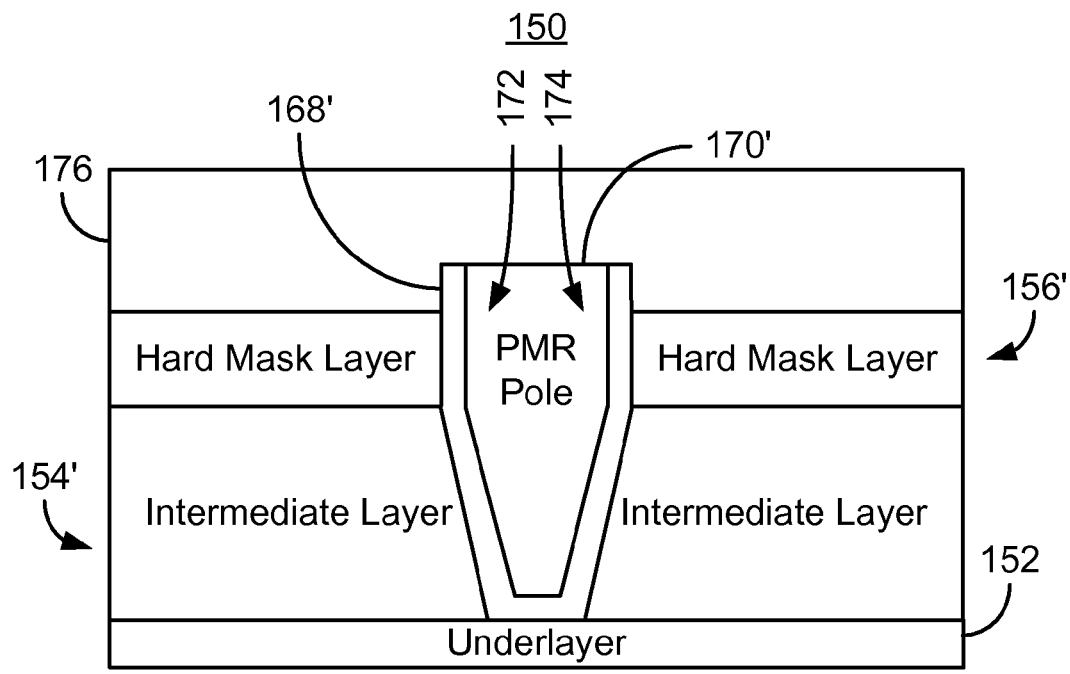

A write gap may be provided on the PMR pole 170', via step 140. FIG. 18 depicts the PMR transducer 150 after step 140 is performed. Thus, a write gap 176 has been provided. In one embodiment, the write gap 176 may be an insulator, such as aluminum oxide. In another embodiment, other material(s) may be used.

Using the method 120, the PMR transducer 150 may be provided. The method 120 shares many of the benefits of the method 100. Because the RIE(s) are used to form the aperture 164 in the hard mask 156' and planarization stop layer 158', the aperture 164 is more symmetric. Furthermore, fencing due to material removed in step 128 is reduced. Thus, asymmetries in the PMR pole 170' may thus be reduced. The critical dimension for the PMR pole 170' may also be less subject to variations. A portion of the sidewalls 172 and 174 is also substantially vertical. As a result, changes in the planarization in step 136 that results in a different height of the PMR pole 170' may not result in a change in the width of the PMR pole 170' near its top. Thus, the critical dimensions of the PMR pole 170' may be less subject to variations. Because the seed layer 168' is provided using ALD and may be nonmagnetic, the seed layer 168' may be used to tailor the width of the PMR pole 70'. The PMR pole 170' may, therefore, be made thinner. Consequently, the method 120 may be used to fabricate a PMR pole having improved performance at higher densities.

Figure 19:
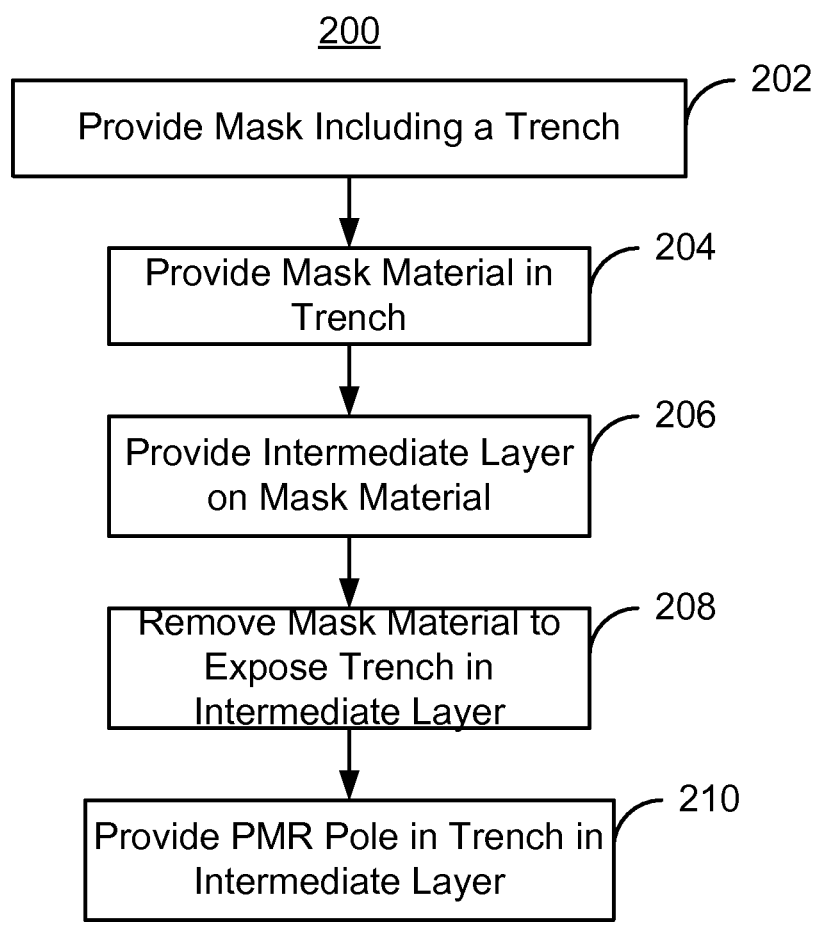
FIG. 19 is a flow chart depicting another embodiment of a method for fabricating a PMR transducer.

FIG. 19 is a flow chart depicting another embodiment of a method 200 for fabricating a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 200 is also described in the context of providing a single PMR transducer. However, the method 200 may be used to fabricate multiple transducers at substantially the same time.

A mask having a first trench therein is provided, via step 202. The trench has a top wider than its bottom. Consequently, the trench may be used for a PMR pole. In addition, the trench extends through the mask. In one embodiment, the mask is a photoresist mask. In such an embodiment, the trench may be provided using photolithography.

A mask material is provided in the trench, via step 204. In one embodiment, the mask material is plated. For example, the mask material may include NiFe. An intermediate layer is provided on the mask material, via step 206. In one embodiment, step 206 includes removing the mask prior to providing the intermediate layer. Step 206 may also include providing multiple layers. Further, planarization markers may also be provided. In one embodiment, planarization markers may be provided close to the mask material. For example, the planarization marker(s) may be as close as 0.5 micron from the mask material. In another embodiment, the planarization marker(s) may be as close as 0.2 micron from the mask material.

The mask material is removed, via step 208. Thus, in one embodiment, a planarization or other process that exposes the mask material may be performed prior to step 208. Thus, a trench is provided in the intermediate layer. A PMR pole may then be provided in the trench in the intermediate layer.

Using the method 200, better control over the shape of a PMR pole may be achieved. Because the trench in the intermediate layer is formed from the mask material, the trench may have the desired shape for the PMR pole. Consequently, performance of the PMR transducer may be improved.

Figure 20:
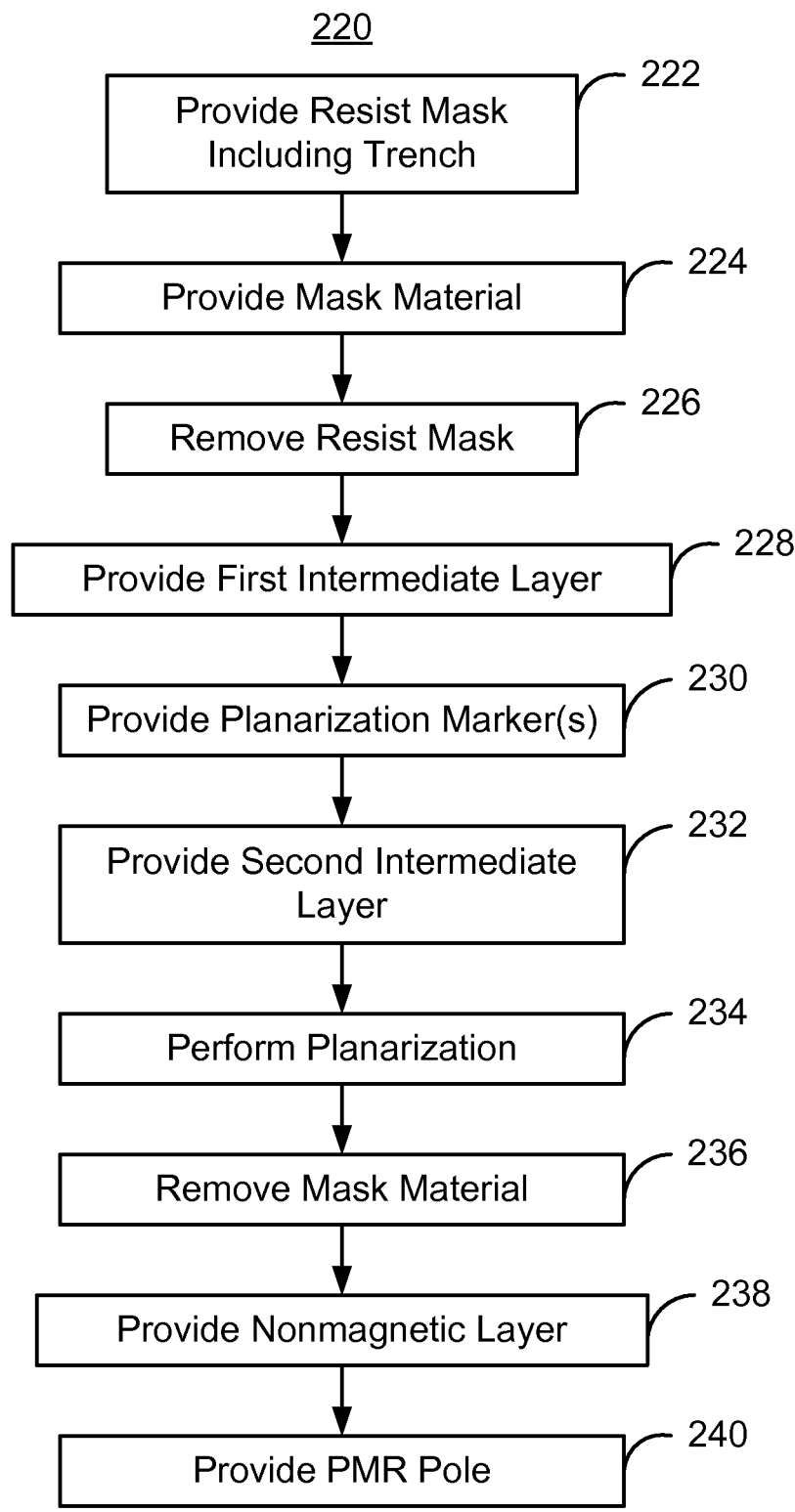
FIG. 20 is a flow chart depicting another embodiment of a method for fabricating a PMR transducer.

FIG. 20 is a flow chart depicting another embodiment of a method 220 for fabricating a PMR transducer. For simplicity, some steps may be omitted. FIGS. 21-26 are diagrams depicting another exemplary embodiment of a PMR transducer 250 during fabrication. For clarity, FIGS. 21-26 are not to scale. Referring to FIGS. 20-26, the method 220 is described in the context of the PMR transducer 250. However, the method 220 may be used to form another device (not shown). The PMR transducer 250 being fabricated may be part of a merged head that also includes a read head (not shown) and resides on a slider (not shown). The method 220 also may commence after formation of other portions of the PMR transducer. In one embodiment, the method 120 starts after formation of an underlayer that may NiCr. The method 220 is also described in the context of providing a single PMR transducer. However, the method 100 may be used to fabricate multiple transducers at substantially the same time.

Figure 21:
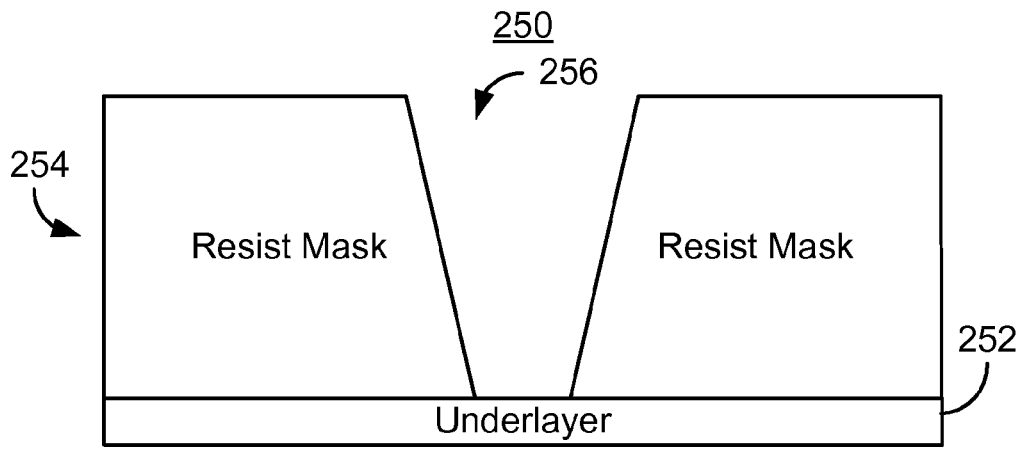
FIGS. 21-26 are diagrams depicting another exemplary embodiment of a perpendicular magnetic recording transducer during fabrication.

A mask having a trench therein is provided, via step 222. The trench has a top wider than the bottom and may extend through the mask. The mask may be a photoresist mask. In such an embodiment, step 222 may include performing photolithography or other processing to form the trench. FIG. 21 depicts the PMR transducer after step 222 is performed. Thus, an underlayer 252 and a resist mask 254 having trench 256 therein are shown.

Figure 22:
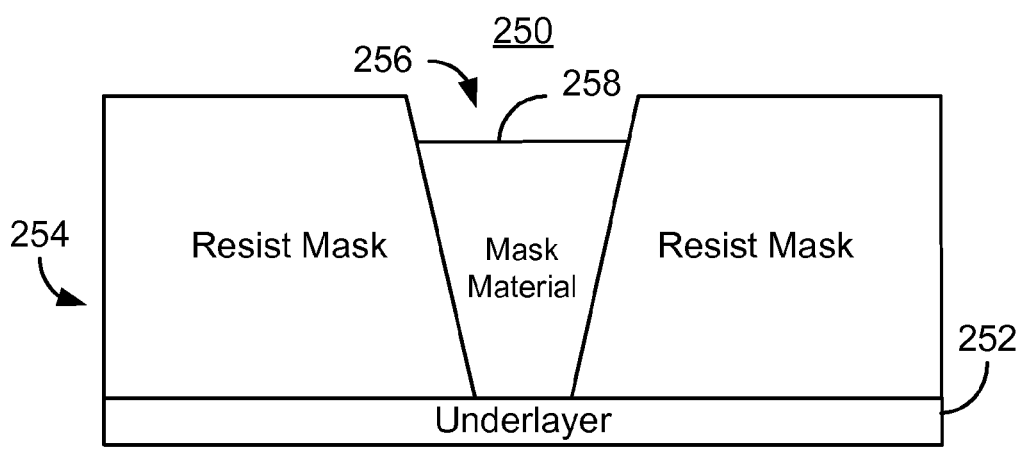

A mask material is provided in the trench, via step 224. The mask material may be a hard mask. In one embodiment, the mask material is plated. The mask material is also noncorrosive and may include, for example, NiFe. In another embodiment, the mask material may be deposited in another manner. Step 224 may also include further processing. For example, a portion of the mask material may be removed such that the remaining mask material resides within the trench. FIG. 22 depicts the PMR transducer 250 after step 224 is performed. Thus, the mask material 258 is also depicted.

Figure 23:
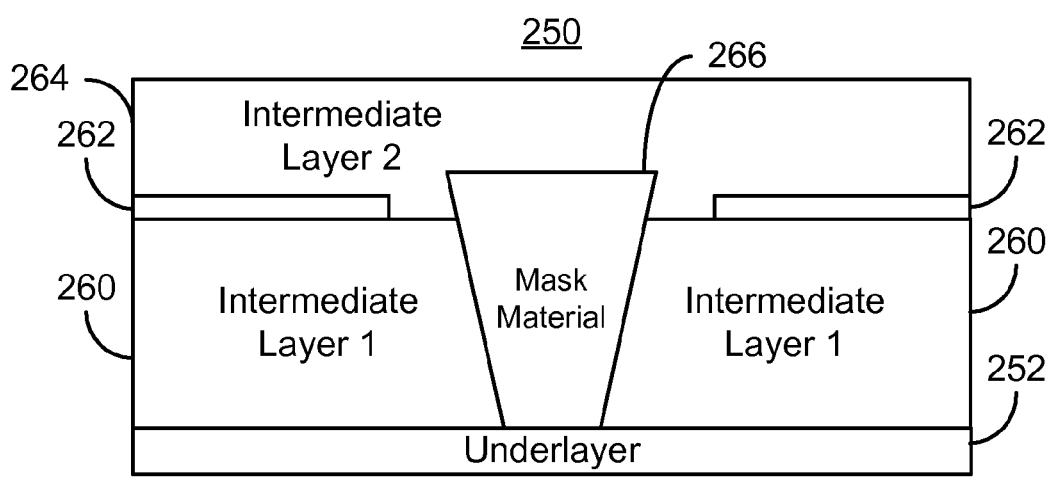

The mask 254 is removed, via step 226. Thus, the sidewalls of the mask material 258 may be exposed. A first intermediate layer is provided, via step 228. At least one planarization marker is provided on the first intermediate layer, via step 230. In one embodiment, the planarization marker is not less than 0.5 micron from the mask material 258. In another embodiment, the planarization marker is not less than 0.2 microns from the mask material 258. A second intermediate layer is provided, via step 232. In one embodiment, the second intermediate layer covers the mask material 258 and the planarization marker(s). FIG. 23 depicts the PMR transducer after step 232 is performed. Thus, first intermediate layer 260, planarization markers 262, and second intermediate layer 264 are shown. The first intermediate layer 260 and the second intermediate layer 264 may share the same composition. For example, both layers 260 and 264 may include aluminum oxide. Consequently, the layers 260 and 264 may be indistinct. However, for clarity of explanation, the layers 260 and 264 are shown as distinct. The planarization markers 262 may be CMP markers. The planarization markers 262 also function as a stop layer. Thus, the planarization markers 262 may include materials such as Ta or Ru.

Figure 24:
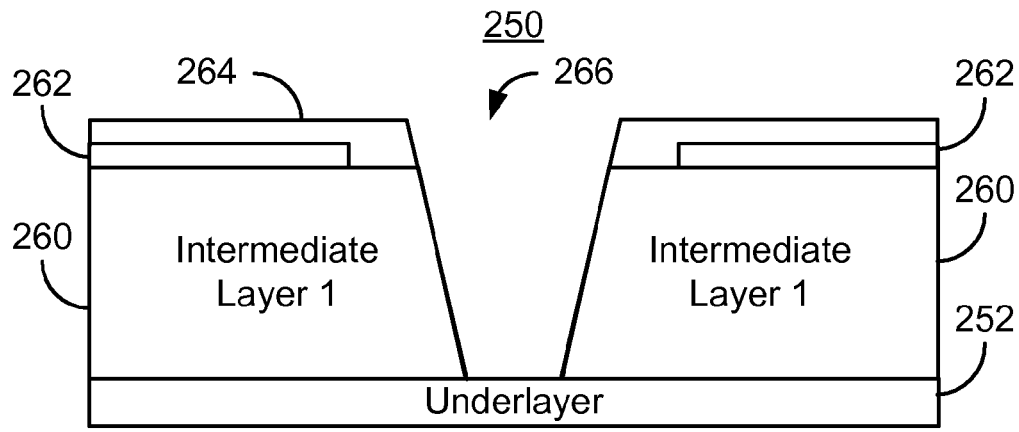

A planarization is performed, via step 234. The planarization is terminated at or above the planarization markers 262. Thus, the planarization is terminated before the mask material 258 is removed and exposes at least a portion of the mask material 258. At least a portion of the mask material 258 is removed from the trench, via step 236. In one embodiment, all of the mask material 258 is removed. FIG. 24 depicts the PMR transducer after step 236 is performed. Thus, a trench 266 has been formed in the intermediate layers 260 and 264.

Figure 25:
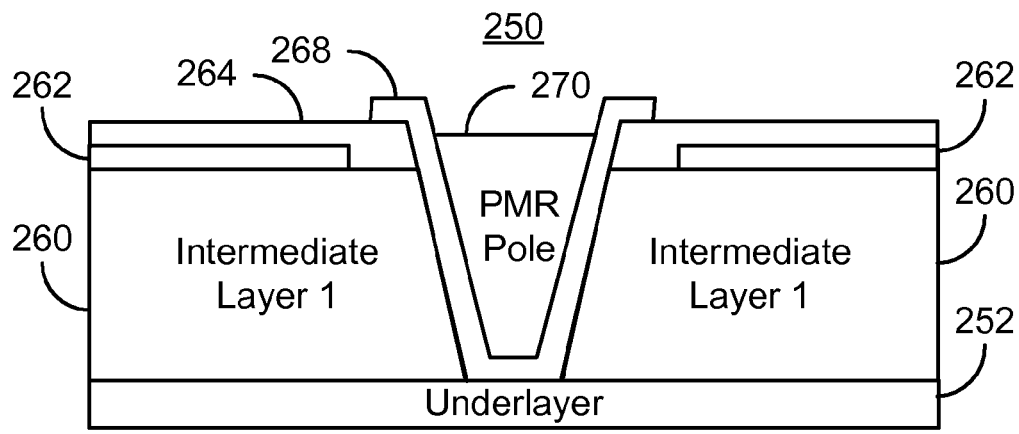
Figure 26:
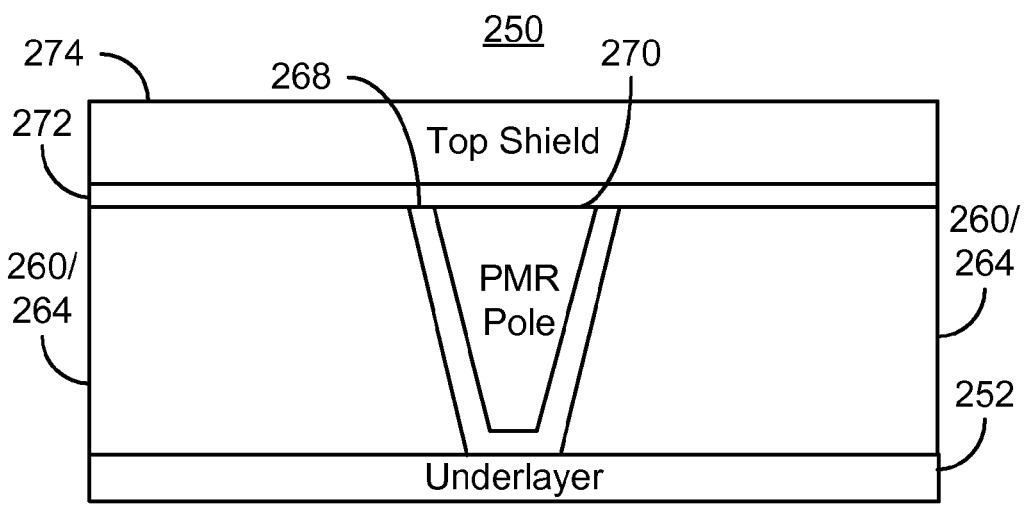

A seed layer is provided in the trench 266, via step 238. In one embodiment, the seed layer is nonmagnetic. If the seed layer is nonmagnetic, the seed layer would be magnetically distinct from the PMR pole. Thus, the thickness of the seed layer may be used to tune the width of the PMR pole being formed. A PMR pole is provided in the trench 266 and on the seed layer, via step 240. Step 240 may include plating the pole material and performing an etch to remove the excess outside of the trench 266. FIG. 25 depicts the PMR transducer after step 240 has been performed. Thus, the seed layer 268 and PMR pole 270 are shown. Fabrication of the PMR transducer may be completed. For example, a write gap and other layers such as a top shield may be provided. FIG. 26 depicts the PMR transducer 250 in an embodiment in which a write gap 272 and top shield 274 are provided.

Using the method 220, better control over the shape of a PMR pole may be achieved. Because the trench 266 in the intermediate layer is formed from the mask material 258, the trench 266 may have the desired shape for the PMR pole. Thus, the PMR pole 270 may have a shape that is closer to what is desired. In addition, the use of the nonmagnetic seed layer 258 allows the critical dimensions of the PMR pole 270, such as the width, to be tailored. Consequently, performance of the PMR transducer 250 may be improved.

We claim:

1. A method for providing a perpendicular magnetic recording (PMR) transducer including an intermediate layer, the method comprising:
   forming a trench in the intermediate layer using at least one reactive ion etch, the trench having a bottom and a top wider than the bottom, the step of providing the trench further including
   providing at least one layer on the intermediate layer; and
   forming an aperture in the at least one layer using a first reactive ion etch of the at least one reactive ion etch, the aperture having an aperture top and an aperture bottom substantially the same as the aperture top such that the aperture has substantially vertical sidewalls;
   providing a seed layer using atomic layer deposition, at least a portion of the seed layer residing in the trench and in the aperture formed in the at least one layer; and
   providing a PMR pole on the seed layer, at least a portion of the PMR pole residing in the trench, the PMR pole having at least one sidewall having a vertical portion corresponding to the aperture and an angled portion corresponding to the trench.

2. The method of claim 1 wherein the step of providing the at least one layer on the intermediate layer further includes:
   providing hard mask layer for the at least one reactive ion etch;
   providing a planarization stop layer on the hard mask layer, the at least one layer including the hard mask layer and the planarization stop layer; and
   providing a resist mask on the planarization stop layer, the resist mask having a resist mask aperture therein.

3. The method of claim 2 wherein the step of forming the aperture further includes:
   forming the aperture in the hard mask layer and the planarization stop layer under the resist mask aperture in the resist mask using the first reactive ion etch of the at least one reactive ion etch.

4. The method of claim 3 wherein the at least one reactive ion etch utilizes a fluorine-containing gas.

5. The method of claim 3 wherein the providing the trench further includes:
   forming the trench in the intermediate layer using an additional reactive ion etch of the at least one reactive ion etch.

6. The method of claim 5 wherein the additional reactive ion etch utilizes a chlorine-containing gas.

7. The method of claim 2 wherein the providing the PMR pole further includes:
   plating a PMR pole layer; and
   performing a planarization terminated with at least a portion of the planarization stop layer remaining.

8. The method of claim 7 wherein the providing the PMR pole further includes:
   removing the portion of the planarization stop layer.

9. The method of claim 1 wherein the seed layer is a nonmagnetic seed layer.

* * * * *